(12) United States Patent
Hardgrave (10) Patent No.: US 8,656,720 B1
(45) Date of Patent: Feb. 25, 2014

(54) EXTENDED RANGE ORGANIC RANKINE CYCLE

(76) Inventor: William David Hardgrave, Carrollton, TX (US)

(*) Notice: Subject to any disclaimer, the term of this patent is extended or adjusted under 35 U.S.C. 154(b) by 174 days.

(21) Appl. No.: 13/106,815

(22) Filed: May 12, 2011

Related U.S. Application Data (60) Provisional application No. 61/333,842, filed on May 12, 2010.

(51) Int. Cl.
*F01K 7/34* (2006.01)
*F01K 27/00* (2006.01)
*F03G 7/00* (2006.01)

(52) U.S. Cl.
USPC ............................. 60/653; 60/641.2; 60/645

(58) Field of Classification Search
USPC ............................................ 60/645–681, 616
See application file for complete search history.

(56) References Cited

U.S. PATENT DOCUMENTS

| | | | |
|---|---|---|---|
| 1,952,281 A | 3/1934 | Ranque | |
| 3,636,706 A | 1/1972 | Minto | |
| 3,775,988 A * | 12/1973 | Fekete | 62/640 |
| 3,788,064 A | 1/1974 | Hawkins | |
| 3,982,378 A | 9/1976 | Sohre | |
| 4,037,414 A | 7/1977 | Nicodemus | |
| 4,121,425 A | 10/1978 | Nicodemus | |
| 4,333,017 A | 6/1982 | O'Connell | |
| 4,442,677 A | 4/1984 | Kauffman | |
| 4,506,524 A | 3/1985 | Schlichtig | |
| 4,542,625 A | 9/1985 | Bronicki | |
| 4,578,953 A | 4/1986 | Krieger et al. | |
| 4,646,524 A * | 3/1987 | Kawashima et al. | 62/5 |
| 4,738,111 A | 4/1988 | Edwards | |
| 4,942,736 A | 7/1990 | Bronicki | |
| 5,038,567 A | 8/1991 | Mortiz | |
| 5,570,579 A | 11/1996 | Larjola | |
| 5,816,048 A | 10/1998 | Bronicki et al. | |
| 6,101,813 A | 8/2000 | Sami et al. | |
| 6,158,676 A * | 12/2000 | Hughes | 239/405 |
| 6,250,086 B1 * | 6/2001 | Cho et al. | 62/5 |
| 6,516,617 B1 | 2/2003 | Schwieger | |
| 6,594,997 B2 | 7/2003 | Romanelli | |
| 6,981,377 B2 | 1/2006 | Vaynberg et al. | |
| 7,225,621 B2 | 6/2007 | Zimron et al. | |
| 7,260,934 B1 | 8/2007 | Roberts | |
| 7,654,095 B2 | 2/2010 | Sullivan | |
| 7,726,135 B2 | 6/2010 | Sullivan | |
| 2003/0213246 A1 | 11/2003 | Coll et al. | |
| 2006/0070660 A1 * | 4/2006 | Swarts | 137/355.12 |
| 2009/0320473 A1 | 12/2009 | Krieger et al. | |
| 2010/0126172 A1 | 5/2010 | Sami | |

\* cited by examiner

*Primary Examiner* — Thomas Denion
*Assistant Examiner* — Brian Inacay
(74) *Attorney, Agent, or Firm* — D. Scott Hemingway; Hemingway & Hansen, LLP (57) ABSTRACT

The present invention includes systems and methods to recover heat from a lower quality heat source and convert that heat represented by its temperature differential range into a different form of extractable energy. In various illustrative examples, the system may include a heat recovery heat exchanger, a conventional counter-flow vortex tube, a power producing turbine, a condenser heat exchanger, and a liquid circulating pump. The system further comprises a condenser heat exchanger that is adapted to receive the turbine exhaust vapor, wherein the temperature of the exhaust vapor is reduced via heat transfer rejecting the waste heat to the surrounding atmosphere at atmospheric temperatures; wherein the compressible working vapor is converted to a saturated liquid and returned to the first heat exchanger by pumping means for further cycling.

42 Claims, 7 Drawing Sheets

EXTENDED RANGE ORGANIC RANKINE CYCLE

RELATED APPLICATION DATA

This application is related to Provisional Patent Application Ser. No. 61/333,842 filed on May 12, 2010, and priority is claimed for this earlier filing under 35 U.S.C. §119(e). This Provisional Patent Application is also incorporated by reference into this utility patent application.

TECHNICAL FIELD OF THE INVENTION

The present invention generally relates to heat recovery for the purpose of electrical or mechanical power generation. Specifically, the present invention is directed to systems and methods amplifying the recovered heat of any quality and conversion thereof into mechanical or electrical power.

BACKGROUND OF THE INVENTION

In general, there is a constant need to increase the operating efficiency of power generation systems. By increasing the efficiency of such power generation systems, capital costs may be reduced, more power may be generated, and there may be a reduction of possible adverse impacts on the environment through a reduction in the amount of waste heat that must ultimately be absorbed by the environment. In other industrial processes, an excess amount of heat may be generated as a byproduct of the process. In many cases, such waste heat is normally absorbed by the environment through use of waste heat devices such as cooling towers.

Several known systems are addressed in the prior art, which includes the following. U.S. Pat. No. 3,208,229 titled "Vortex Tube" by Fulton relates to the design and construction of vortex tubes capable of emitting colder and hotter streams of gas, operating more efficiently, being more compact and more cheaply manufactured. U.S. Pat. No. 5,327,728 by Tunkel is a method for the design of a vortex tube for energy separation, the vortex tube having a long tube, a diaphragm closing one end of the tube having a hole in the center, one or more tangential nozzles piercing the tube just inside the diaphragm, and a throttling valve at the far end of the tube. U.S. Pat. No. 5,561,982 titled "Method for energy separation and utilization in a vortex tube which operates with pressure not exceeding atmospheric pressure" by Tunkel, et al. utilizes a vacuum pump to achieve the pressurized solution to discharge a cool stream connected though the heat exchanger provided to utilize as a cool duty and produce a hot stream at the far end of the tube for a hot duty. U.S. Pat. No. 6,964,168 titled "Advanced Heat Recovery and Energy Conversion Systems for Power Generation and Pollution Emissions Reduction, and Methods of Using Same" by Pierson are various systems and methods for producing mechanical power from a heat source. U.S. Pat. No. 6,318,065 titled "System for Chilling Inlet Air for Gas Turbines" by Pierson is a method and apparatus for chilling water delivery to an inlet air chiller of a gas turbine to lower the temperature of inlet air. This patent does anticipate the useful application of an ORC and refrigerant.

There are several systems employed in various industries to produce useful work from a heat source. The classic Rankine cycle can be utilized to produce power, but this process is complex. The Rankine cycle involves isothermal (constant temperature) boiling as the working fluid, i.e., water, is converted from a liquid to a vapor state. Typically, waste heat from gas turbines or other, similar, high quality heat sources can be recovered using steam at multiple temperatures and pressures. Multiple operating levels are required because the temperature-enthalpy profile is not linear.

Similar to the classic Rankine cycle, an Organic Rankine cycle utilizes a low temperature working fluid in a closed cycle such as isoButane or isoPentane in place of steam in the classic cycle. The system remains complex and is highly inefficient at low operating temperature differentials. There is a need to simplify the Rankine cycle process while having the capability to recover more heat and to recover heat from a low quality heat source while amplifying its temperature-enthalpy. The present invention is intended to solve these problems as the invention is directed generally to low temperature power generation, and more specifically to the use of segregated energy streams to achieve a high efficiency vapor power Organic Rankine Cycle.

SUMMARY OF THE INVENTION

The present invention is generally directed to various systems and methods for producing electrical or mechanical power from a heat source. In various illustrative examples, the devices employed in practicing the present invention include a heat recovery heat exchanger, a conventional counter-flow vortex tube, a power producing turbine, a condenser heat exchanger, and a liquid circulating pump.

The present invention can be used with an Extended Range Organic Rankine (EROR) cycle that uses a low temperature working fluid to recover heat from a lower quality heat source; extends the temperature differential range by amplifying the recovered heat (enthalpy) and temperature; supplies a power producing turbine adapted to receive the amplified heat energy to generate extractable power; supplies a condenser heat exchanger that is adapted to receive the turbine exhaust vapor; wherein, the temperature of the exhaust vapor is reduced via heat transfer rejecting the waste heat to the surrounding atmosphere at atmospheric temperatures; wherein, the working vapor is converted to a saturated liquid and returned to the first heat exchanger by a pumping means for further cycling. The working fluid in an ORC follows a closed loop and is re-used constantly, and the efficiency of an ORC in a low-temperature heat recovery application can be very sensitive to the temperature differential range within which it operates.

Various embodiments of the present invention simplifies the process while having the capability to recover more heat to economically recover heat from a much lower quality heat source to amplify the recovered heat and to convert the amplified heat represented by its temperature differential into a different form of extractable energy. In general, what is desired are systems and methods for improving the efficiencies of various power generation systems and systems and methods for utilizing waste heat sources to improve operating efficiencies of various power and industrial systems.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims,

DETAILED DESCRIPTION OF THE INVENTION

In many cases, temperatures change significantly during the lifetime of an Organic Rankine Cycle power generation plant. Geothermal plants, for example, may be designed for a particular temperature of low-grade geothermal heating fluid, but the plant may lose efficiency as the ground fluid cools over time thereby shifting the plant operating temperature away from its intended design point. Air-cooled Organic Rankine Cycle power generation plants that use a particular temperature of geothermal heating fluid, from an earth-bound source or other sources, as the heating fluid deviates from their design operating conditions as the outside air temperature changes (e.g. daily temperature fluctuation, seasonal temperature fluctuation).

The present invention is directed to a thermodynamic property amplification system using a given heat source that is provided by hydrocarbon combustion or in the preferred application heat provided by low-grade geothermal energy from the earth such as an Organic Rankine Cycle. The supercritical working vapor from the first heat-exchanger is segregated by a conventional counter-flow vortex tube (or bank of vortex tubes) forming hot and cool fractions where the hot temperature is raised above the first heat-exchanger source fluid first temperature. The vortex phenomenon and energy segregation in rotating flow occurs only with a compressible fluid. The prior art does not conduct an energy segregation in any rotating liquid flow.

Figure 1:
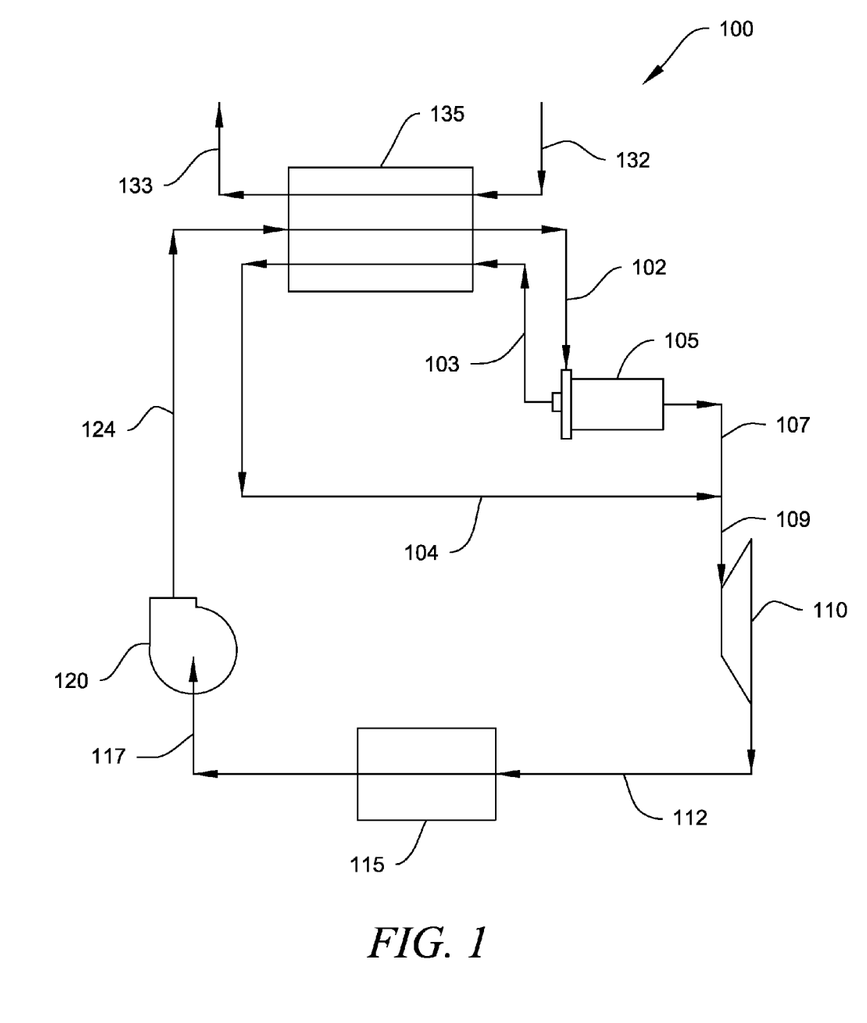
FIG. 1 is a schematic diagram of one illustrative embodiment of the present invention employing at least one vortex tube and first heat exchanger are configured to amplify the recovered heat.

The present invention is shown in FIG. 1, which is comprised of a heat-exchanger HE 135 that receives a heated source fluid supply 132 and releases a cooler exhaust fluid 133. The heat-exchanger HE 135 heats a fluid source 124 to provide a heated supply fluid stream, $T_o$ 102 to a counterflow vortex tube VT 105. The high flow-rate low-grade temperature vortex tube VT 105 segregates the supply fluid stream, $T_o$ 102, into a hot fluid stream, $T_H$ 107, and cool fluid stream, $T_C$ 103, fraction streams. At the vortex tube VT 105, a fraction of intensely hot vapor, $T_H$ 107, created by the corollas force compression through the throttle valve in the vortex tube VT 105 is fed into stream 109.

The supply fluid stream $T_o$ 102 is provided through to the vortex tube VT 105, which discharges a fraction of cool expanded vapor, $T_C$ 103, (also called the cool fraction) through a small hole in the diaphragm back to a return stream of heat exchanger HE 135. After exiting the heat exchanger, HE 135, the cool fraction $T_C$ 103 fluid stream is provided back to the heat exchanger 135 for the application of an increased heat supply, to provide a higher temperature fluid stream, 104. The heated stream $T_H$ 107 is combined or mixed with heated fluid stream 104 to produce the fluid stream, $T_B$ 109.

The cool fraction stream, $T_C$ 103, is routed to the first heat-exchanger HE 135 for reheating, and exits the heat exchanger HE 135 at an increased temperature at fluid stream 104 to the level of the first heat-exchanger source temperature. This stream 104 is combined and mixed with the intensely hot fraction, $T_H$ 107 (superheated flow) into $T_B$ 109. The effect is to thermally communicate with the source and increase the cool fraction $T_C$ 103 fluid stream temperature at which energy is added externally, thereby increasing the energy-conversion efficiency with a back flow stream through the heat exchanger HE 135.

The function of the counter-flow vortex tube in the present invention is to receive the evaporated heat-exchanger flow supply of supercritical vapor, $T_o$ 102, through tangential nozzle(s) and to discharge a fraction of cool expanded vapor, $T_C$ 103, through a small hole in the diaphragm, and a fraction of intensely hot vapor fluid stream, $T_H$ 107, created by the corollas force compression through the throttle valve. It is important to note that vapor does not respond as an ideal gas; therefore, actual data should be used to predict performance of the vortex tube. By separating the hot and cool fractions causing a reduction in the pressure, the cool fraction, $T_C$ 103, is routed to the first heat-exchanger for reheating, to step up the cool fraction temperature, $T_C$ 103, to the level of the first heat-exchanger source temperature and combine stream 104 with the intensely hot fraction, (superheated flow) both to be mixed with fluid stream, $T_H$ 107 to produce $T_B$ 109.

The combined fluid stream $T_B$ 109 is routed to the power producing turbine 110, yielding a greater power extraction than previously attained with other systems. The combined stream $T_B$ 109 is fed into turbine 110 to produce electricity or convert the heat energy into a work, electrical or motive force. The temperature and pressure of combined stream 109 is lowered when it emerges from turbine 110 in feed stream 112, which is fed into a condenser 115. The condensed fluid stream 117 is transmitted from the condenser 115 at a lower temperature, and is fed into pump 120. Pump 120 transmits the fluid stream 124 back to the heat exchanger HE 135 to complete the cycle, and reheat the fluid stream into supply fluid stream $T_o$ 102 for transmission back to the vortex tube VT 105.

A choice of $CO_2$ as an elevated temperature, compressible fluid can achieve good thermal contact (wet) at commercial rates of heat production from the Texas lower-grade geothermal reservoirs (EGSs) for sustained periods of time. The main cycle typically employs a lower-pressure refrigerant with reasonable vapor pressures at its normal operating condition.

ASHRAE refrigerant designations: HFC-134a, R-125, R-410A, and R-407C (23/25/52) have been developed for this type application.

The illustrative embodiment of the present invention shown in FIG. 1 discloses a system having a high-pressure working fluid that enters a first heat exchanger and exits as a superheated compressible vapor due to heat transfer with a hot fluid, either a gas, a liquid, or a two-phase mixture of gas and liquid. The first heat exchanger may be any type of heat exchanger capable of transfer heat from one fluid stream to another fluid stream. For example, the heat exchanger may be a shell-and-tube heat exchanger, a plate-fin-tube coil type of exchanger, a bare tube or finned tube bundle, or a welded plate heat exchanger. Thus, the present invention should not be considered as limited to any particular type of heat exchanger unless such limitations are expressly set forth in the appended claims.

The source of the hot fluid for the first heat exchanger may either be a geothermal source, a waste heat source, from any of a variety of sources, or heat may intentionally be supplied to the system, e.g., by a gas burner or the like. However, any heat source of sufficient quality and temperature may be utilized if it can be obtained economically. In some cases, the first heat exchanger may be referred to as a "waste heat recovery heat exchanger," indicating that the source of the fluid is from what would otherwise be a waste heat source, although the present invention is not limited to such situations.

At least one conventional counter-flow vortex tube adapted to receive and segregate the compressible working vapor into high and low energy fractions at a lesser-pressure; extending the temperature differential range by amplifying the recovered heat and temperature transferred from the thermogenic fluid. By separating the energies, causing a reduction in pressure, the lesser energy fraction is passed back through the first heat exchanger for reheating, combining the reheated vapor with the intensely high energy vapor fraction increasing the total vapor to a second temperature, higher than the input temperature, i.e., amplifying the energy by increasing the first temperature to a second temperature prior to routing to a power producing turbine. Amplification may be farther increased with the addition of vortex tubes and associated piping. The inventive thermodynamic amplifier achieves superior inherent features:

1) segregate the compressible supercritical working fluid from the first heat exchanger into hot and cool fractions, where the hot temperature is elevated above the first heat exchanger first temperature; and
2) reheat the cool fraction increasing the cool temperature to that of the first heat exchanger.
3) combine the two fractions for a net gain and a second temperature.

At least one power producing turbine adapted to receive the amplified second temperature lesser-pressure working vapor. The vapor is expanded in the turbine and the design of the turbine converts kinetic and potential energy of the superheated compressible vapor into mechanical energy in the form of torque on an output shaft. Any type of commercially available turbine suited for use in the systems described herein may be employed, e.g., an expander, a turbo-expander, or a power turbine. The shaft horsepower available on the shaft of the turbine can be used to produce power by driving an illustrative generator, or to drive a compressor, a pump, or other mechanical device, either directly or indirectly. Additionally, as will be recognized by those skilled in the art after a complete reading of the present application, a plurality of turbines may be employed with the system depicted in FIG. 1.

Figure 2:
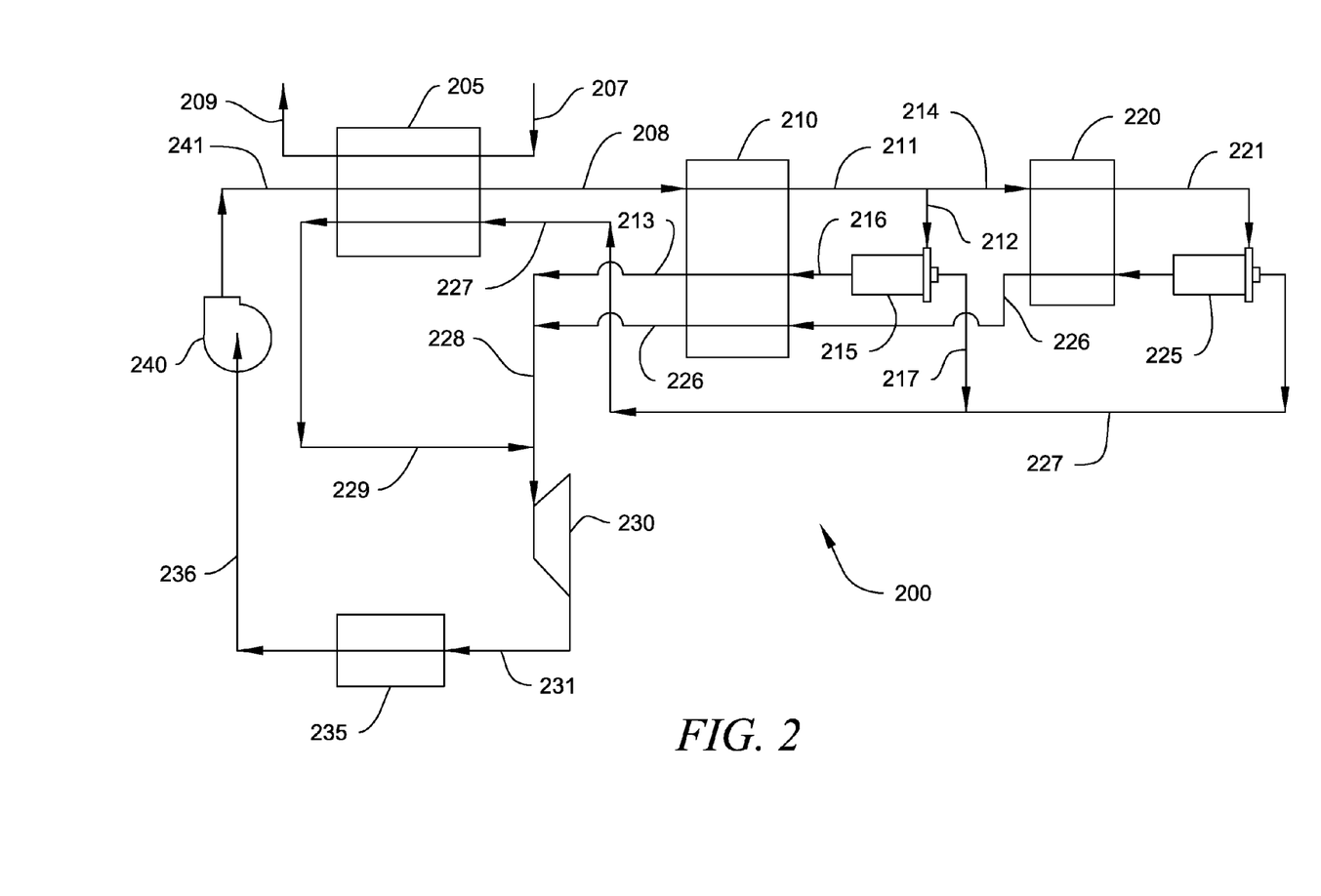
FIG. 2 is a schematic diagram of one illustrative embodiment of the present invention employing a plurality of vortex tubes and first heat exchanger are configured to amplify the recovered heat.

The present invention is shown in FIG. 2, which is comprised of a first heat-exchanger HE 205 that receives a heated source fluid supply 207 and releases a cooler exhaust fluid 209. The first heat-exchanger HE 205 heats a fluid source 241 to provide a heated supply fluid stream, T 208 to a second heat exchanger 210, which emits a fluid stream 211. The fluid stream 211 is split into fluid streams 212 and 214, with fluid stream 212 being provided to a first counterflow vortex tube VT 215. The first high flow-rate low-grade temperature vortex tube VT 215 segregates the fluid stream 212 into a hot fluid stream, $T_H$ 216, and cool fluid stream, $T_C$ 217, fraction streams. At the first vortex tube VT 215, a fraction of intensely hot vapor, $T_H$ 216, created by the corollas force compression through the throttle valve in the first vortex tube VT 215, where fluid stream 213 is fed into fluid stream 228.

The fluid stream 214 is provided to a third heat-exchanger HE 220, which transfers a fluid stream 221. The fluid stream 221 is provided to a second counterflow vortex tube VT 225. The second high flow-rate low-grade temperature vortex tube VT 225 segregates the fluid stream 221 into a hot fluid stream, $T_H$ 226, and cool fluid stream, $T_C$ 227, fraction streams. At the second vortex tube VT 225, a fraction of intensely hot vapor, $T_H$ 226, created by the corollas force compression through the throttle valve in the second vortex tube VT 225, where fluid stream 226 is fed into fluid stream 228.

Hot fluid streams 213 and 226 are combined into hot fluid stream 228 after hot fluid stream 216 transfers heat in the first heat exchanger 210 and hot fluid stream 226 transfers heat in the first heat exchanger 210 and the second heat exchanger 220. A cool expanded vapor stream, $T_C$ 217, (also called the cool fraction) is released through a small hole in the diaphragm of the first vortex tube. A cool expanded vapor fluid stream, $T_C$ 227 (also called the cool fraction) is released through a small hole in the diaphragm of the second vortex tube. The cool expanded vapor fluid streams, $T_C$ 217 and 227, are combined in fluid stream 227, where that fluid stream 227 is returned back to a return stream of heat exchanger HE 205 for reheating.

The cool fraction $T_C$ 227 fluid stream is provided back to the heat exchanger HE 205 for the application of an increased heat supply and to provide an exhaust higher temperature fluid stream, 229. The heated stream $T_H$ 228 is combined or mixed with heated fluid stream 229 to produce the fluid stream that is routed to the turbine 230. The combined fluid stream 229 is routed to the power producing turbine 230, yielding a greater power extraction than previously attained with other systems. The combined stream 229 is fed into turbine 230 to produce electricity or convert the heat energy into a work, electrical or motive force.

The temperature and pressure of combined stream 229 is lowered when it emerges from turbine 230 in feed stream 231, which is fed into a condenser 235. The condensed fluid stream 236 is transmitted from the condenser 235 at a lower temperature, which is fed into pump 240. Pump 240 transmits the fluid stream 241 back to the heat exchanger HE 205 to complete the cycle, and reheat the fluid stream into supply fluid stream $T_o$ 208 for transmission back to the first and second vortex tubes VT 215 and 225.

The function of the first and second counter-flow vortex tubes in the present invention is to receive the evaporated heat-exchanger flow supply of supercritical vapor, $T_o$ 208 and 221, through tangential nozzle(s) and to discharge a fraction of cool expanded vapor, $T_C$ 217 and 227, through a small hole in the diaphragm, and a fraction of intensely hot vapor fluid stream, $T_H$ 216 and 226, created by the corollas force compression through the throttle valve. It is important to note that vapor does not respond as an ideal gas; therefore, actual data should be used to predict performance of the vortex tube.

By separating the hot and cool fractions causing a reduction in the pressure, the cool fraction, $T_C$ 217 and 227, is routed to the first heat-exchanger for reheating, to step up the cool fraction temperature, $T_C$ 217 and 227, to the level of the first heat-exchanger source temperature and combine fluid stream 229 with the intensely hot fraction 228 (superheated flow) for feeding to the power turbine 230.

A choice of $CO_2$ as an elevated temperature, compressible fluid can achieve good thermal contact (wet) at commercial rates of heat production from the Texas lower-grade geothermal reservoirs (EGSs) for sustained periods of time. The main cycle typically employs a lower-pressure refrigerant with reasonable vapor pressures at its normal operating condition. ASHRAE refrigerant designations: HFC-134a, R-125, R-410A, and R-407C (23/25/52) have been developed for this type application.

Referring now more particularly to the accompanying drawing and particular to the schematic diagrams of FIGS. 1 & 2, which illustrates embodiments of the invention. In those figures, a thermodynamic amplifier comprised of a first heat-exchanger and at least one conventional counter-flow vortex tube with a diaphragm closing one end of the tube body and a small hole in the center of the diaphragm, at least one tangential nozzle piercing the tube body just inside the diaphragm, and an obstruction and throttle valve at the far end of the tube body. The function of the counter-flow vortex tube is to receive the evaporated heat-exchanger flow supply of supercritical vapor, $T_1$, through tangential nozzle(s) and to discharge a fraction of cool expanded vapor, $T_2$, through a small hole in the diaphragm, and a fraction of intensely hot vapor, $T_3$, created by the corollas force compression through the throttle valve.

It is important to note that vapor does not respond as an ideal gas; therefore, actual data should be used to predict performance of the vortex tube. By separating the hot and cool fractions causing a reduction in the pressure, the cool fraction, $T_2$, is routed to the first heat-exchanger for reheating, to step up the cool fraction temperature, $T_4$, to the level of the first heat-exchanger source temperature and combine with the intensely hot fraction, $T_3$, (superheated flow) both to be mixed, $T_5$.

The effect is to thermally communicate with the source and increase the cool fraction temperature, $T_4$, at which energy is added externally, thereby increasing the energy-conversion efficiency. The reheated cool fraction is routed to the power producing turbine-inlet thereby amplifying the enthalpy input from $h_1$ to $h_5$, extending and maintaining the enthalpy-spread from $h_5$ to $h_6$, and temperature, $T_5$, across the power producing turbine yielding a greater power extraction. The relationship of a particular source temperature, $T_o$, and the amplified temperature output, $T_5$, is given by:

$$2T_5 = 3T_o - (T_2 + 2\Delta T_{jT})$$

where $\Delta T$, or $(T_o - T_5) > 2\Delta T_{jT}$ and $T_o \geq (T_5 + 2\Delta T_{jT})$ An energy balance for the amplifier yields:

$$h_1 = \frac{1}{2}h_2 + \frac{1}{2}h_3,$$

and $$h_5 = \frac{1}{2}h_3 + \frac{1}{2}h_4$$

when $h_2 = h_4$ then $h_2 = h_4$ therefore when there is no reheat between $h_2$ and $h_4$ then there is no gain or amplification.

The addition of a thermal intensifier as depicted in FIG. 2 enables the use of lower temperature thermal sources at efficiencies only seen in higher temperature applications for power generation. FIG. 2 demonstrates one combination of two vortex intensifiers arranged in parallel. Even though only two thermal vortex tubes are shown, more than two could be arranged in parallel. The parallel arrangement of vortex tubes yields the best pressure, temperature, and flow relation for this application, and the parallel arrangement of vortex tubes enables the heating of the high pressure stream at the same pressure by each vortex tube, whereas the vortex tubes are arranged in series would lower the high pressure stream pressure each time the temperature was increased. The parallel arrangement of vortex tubes yields a high pressure high temperature stream, whereas, the series arrangement yields a low pressure extremely high temperature stream.

The table below lists some examples of representative R410A values expected from a FIG. 2 thermal intensifier ($2^d$ row) and FIG. 4 ($1^{st}$, $3^d$, $4^{th}$ row). The temperature and pressure values are ideal and representative of the expected intensified temperatures and pressures.

|   | Source Input | 221 Output | 227 | 226 (Output) | 211 | 217 | 216 | 226 | 208 | 213 | 241 | 227 | 227 |
|---|---|---|---|---|---|---|---|---|---|---|---|---|---|
| T | 145.3 | 172.5 | 82.0 | 226.0 | 160.4 | 76.0 | 220.0 | 172.5 | 145.3 | 160.4 | 101.6 | 88.7 | 85.6 |
| P |  | 1,400.0 | 682.0 | 682.0 | 1,400.0 | 682.0 | 682.0 | 682.0 | 1,400.0 | 682.0 | 1,400.0 | 682.0 | 682.0 |
| ṁ |  | 2 | ½ | ½ | 3 | ½ | ½ | ½ | 3 | ½ | 3 | 1½ | 2 |
| T | 191.7 | 215.0 | 108.0 | 252.0 | 203.0 | 104.0 | 248.0 | 215.0 | 191.7 | 203.0 | 101.6 | 108.0 | 106.0 |
| P |  | 1,400.0 | 866.0 | 866.0 | 1,400.0 | 866.0 | 866.0 | 866.0 | 1,400.0 | 866.0 | 1,400.0 | 866.0 | 866.0 |
| ṁ |  | 1 | ½ | ½ | 2 | ½ | ½ | ½ | 2 | ½ | 2 | ½ | 1 |
| T | 134.7 | 180.3 | 85.0 | 229.0 | 160.4 | 76.0 | 220.0 | 180.3 | 134.7 | 160.4 | 101.6 | 85.0 | 80.5 |
| P |  | 1,400.0 | 682.0 | 682.0 | 1,400.0 | 682.0 | 682.0 | 682.0 | 1,400.0 | 682.0 | 1,400.0 | 682.0 | 682.0 |
| ṁ |  | 1 | ½ | ½ | 2 | ½ | ½ | ½ | 2 | ½ | 2 | ½ | 1 |
| T | 187.4 | 207.0 | 105.0 | 249.0 | 195.1 | 85.0 | 229.0 | 207.0 | 187.4 | 195.1 | 101.6 | 105.0 | 95.2 |
| P |  | 1,400.0 | 682.0 | 682.0 | 1,400.0 | 682.0 | 682.0 | 682.0 | 1,400.0 | 682.0 | 1,400.0 | 682.0 | 682.0 |
| ṁ |  | 1 | ½ | ½ | 2 | ½ | ½ | ½ | 2 | ½ | 2 | ½ | 1 |

Figure 3:
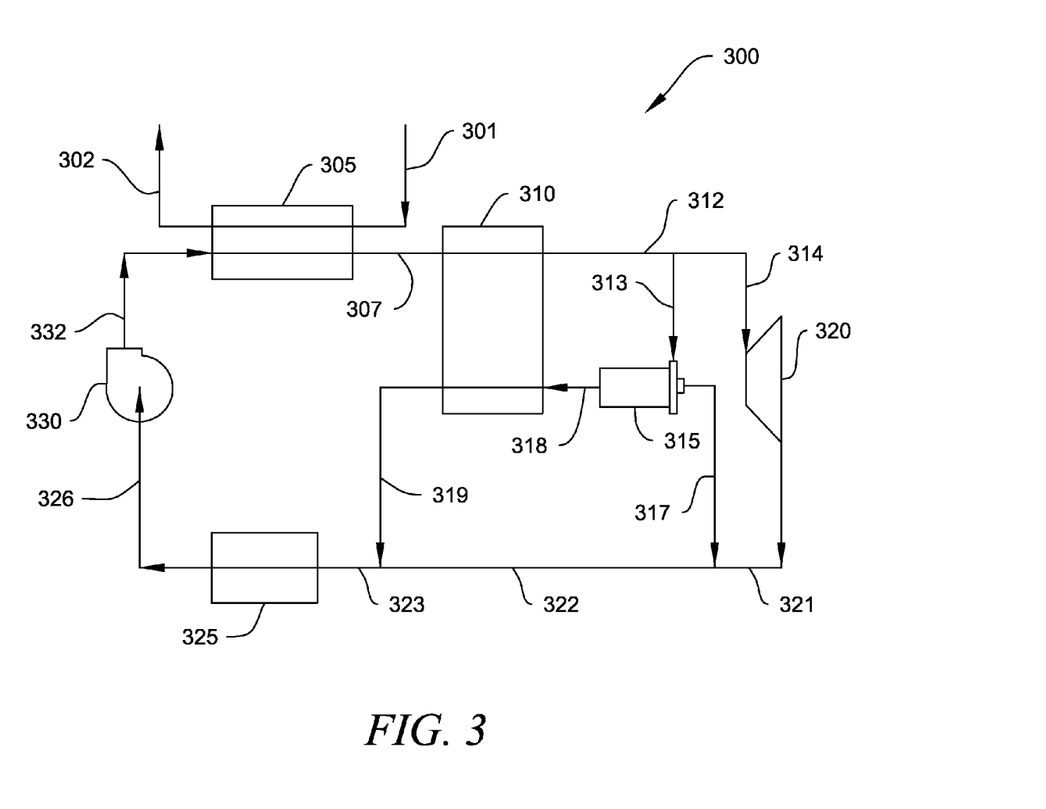
FIG. 3 is a schematic diagram of one illustrative embodiment of the present invention employing at least one vortex tube, pre-heat exchanger, and first heat exchanger are configured to amplify the recovered heat.

Another embodiment of the present invention is shown in FIG. 3, which is comprised of a first heat-exchanger HE 305 that receives a heated source fluid supply 301 and releases a cooler exhaust fluid 302. The first heat-exchanger HE 305 heats a fluid source 332 to provide a heated supply fluid stream, $T_o$ 307 to a second heat exchanger 310, which emits a fluid stream 312. The fluid stream 312 is split into fluid streams 313 and 314, with fluid stream 313 being provided to a first vortex tube VT 315.

The first high flow-rate low-grade temperature vortex tube VT 315 segregates the fluid stream 313 into a hot fluid stream, $T_H$ 318, and cool fluid stream, $T_C$ 317, fraction streams. At the first vortex tube VT 315, a fraction of intensely hot vapor, $T_H$ 318, created by the corollas force compression through the throttle valve in the first vortex tube VT 315 is used to heat stream 307 up to the temperature of stream 312. The cool fluid stream 317 is fed into exhaust fluid stream 321 to produce fluid stream 322.

The fluid stream 318 is provided to a second pre-heat-exchanger HE 310, which transfers heat from the hot fluid stream 318 to increase the temperature of the fluid flows 307 at the pre-heat-exchanger HE 310. The pre-heat-exchanger 310 emits a hot input fluid 312 to the power producing turbine 320 via fluid flow 314, yielding a greater power extraction than previously attained with other systems. The combined stream fluid flow 314 is fed into turbine 320 to produce electricity or convert the heat energy into a work, electrical or motive force.

The temperature and pressure of combined stream fluid flow 314 is lowered when it emerges from turbine 312 in feed stream 321, which is fed into a condenser 325 after having fluid streams 317 and 319 combined to feed stream 321. The condensed fluid stream 326 is transmitted from the condenser 325 at a lower temperature, which is fed into pump 330 via fluid stream 326. Pump 330 transmits the fluid stream 332 back to the heat exchanger HE 305 to complete the cycle, and reheat the fluid stream into supply fluid stream $T_o$ 307 for transmission back to the first vortex tube VT 315 and the power turbine 320 after being operated on at the pre-heat-exchanger 310.

The hot fluid stream 319 emitted by pre-heat-exchanger HE 310 is combined with fluid flow 322 to produce fluid flow 323, which is provided to a condenser 325. The condensed fluid stream 326 is transmitted from the condenser 325 at a lower temperature, which is fed into pump 330. Pump 330 transmits the fluid stream 332 back to the heat exchanger HE 305 to complete the cycle, and reheat the fluid stream into supply fluid stream $T_o$ 307 for transmission back to the first vortex tubes VT 315.

The function of the first counter-flow vortex tube in the present invention is to receive the evaporated heat-exchanger flow supply of supercritical vapor, $T_o$ 313, through tangential nozzle(s) and to discharge a fraction of cool expanded vapor, $T_C$ 317, through a small hole in the diaphragm, and a fraction of intensely hot vapor fluid stream, $T_H$ 318, created by the corollas force compression through the throttle valve. It is important to note that vapor does not respond as an ideal gas; therefore, actual data should be used to predict performance of the vortex tube. By separating the hot and cool fractions causing a reduction in the pressure, the cool fraction, $T_C$ 318, is routed to the pre-heat-exchanger 310 for stepping up the input supply fluid stream 307 and 312 that were being provided as stream 314 to the power turbine 320.

The FIG. 3 embodiment comprises a first heat-exchanger 305 and high-pressure large mass flow rate counter-flow vortex tube VT 315, and a pre-heat-exchanger 310. In this embodiment a first fluid stream, $T_1$ 313, is segregated into two fractions, namely hot fluid stream $T_H$ 318, and cold fluid stream, $T_C$ 317. The hot fluid stream, $T_H$ 318 is a fraction flow from the vortex tube body that is routed to the pre-heat-exchanger 310 to thermally communicate with a first fluid stream 307 and transfer heat to that fluid flow stream. The cold fluid stream $T_C$ 317 fraction is involved further with the condenser operation, see FIG. 3, which reduces the turbine exhaust fluid stream 321 temperature.

The temperature, $T_H$, and heat, $h_H$, (enthalpy) of the hot fraction are significantly higher than the first temperature, $T_1$, and heat, $h_1$. The mass flow-rate passing through the turbine from the first heat exchanger is adversely affected by splitting the flow between the vortex tube and the turbine, but the advantage is the ability to use a low-grade heat source, $T_o$, to generate power. By developing a higher turbine inlet temperature, $T_5$, by an additional energy transfer, the vapor power cycle is enabled to produce power more efficiently than if the first temperature, $T_1$, was directly used.

$$T_H = 2(T_1 - \Delta J) - T_C$$

One illustrative embodiment of the present invention will now be described with reference to FIG. 3. As shown therein, a high-pressure working fluid enters a first heat exchanger and exits as a superheated compressible vapor due to heat transfer with a hot fluid, either a gas, a liquid, or a two-phase mixture of gas and liquid. The first heat exchanger may be any type of heat exchanger capable of transfer heat from one fluid stream to another fluid stream. For example, the heat exchanger may be a shell-and-tube heat exchanger, a plate-fin-tube coil type of exchanger, a bare tube or finned tube bundle, and a welded plate heat exchanger. Thus, the present invention should not be considered as limited to any particular type of heat exchanger unless such limitations are expressly set forth in the appended claims.

The source of the hot fluid for the first heat exchanger may either be a geothermal source, a waste heat source, from any of a variety of sources, or heat may intentionally be supplied to the system, e.g., by a gas burner or the like. However, any heat source of sufficient quality and temperature may be utilized if it can be obtained economically. In some cases, the first heat exchanger may be referred to as a "waste heat recovery heat exchanger," indicating that the source of the fluid is from what would otherwise be a waste heat source, although the present invention is not limited to such situations.

At least one conventional counter-flow vortex tube adapted to receive and segregate the compressible working vapor into high and low energy fractions; routing the low pressure high energy working vapor fraction to a pre-heat exchanger adapted to receive the high pressure first temperature working vapor and low-pressure high-energy working vapor fraction, wherein the steps to increase the temperature are for the high pressure first temperature working vapor in the pre-heat exchanger from a first temperature to a second temperature, higher than the temperature of the thermogenic fluid, by transferring heat from the low pressure high energy working vapor fraction prior to the introduction of the high pressure working vapor at the second temperature into both the vortex tube and the power producing turbine or other useful devices; extending the high pressure working vapor temperature range by amplifying the recovered heat and temperature energy transferred from the thermogenic fluid. Amplification may be further increased with the addition of vortex tubes and associated piping. The inventive thermodynamic amplifier achieves superior inherent features.

At least one power producing turbine or other useful devices adapted to receive the amplified second temperature lesser-pressure working vapor. The vapor is expanded in the turbine and the design of the turbine converts kinetic and potential energy of the superheated compressible vapor into mechanical energy in the form of torque on an output shaft. Any type of commercially available turbine suited for use in the systems described herein may be employed, e.g., an expander, a turbo-expander, and a power turbine. The shaft horsepower available on the shaft of the turbine can be used to produce power by driving an illustrative generator, or to drive a compressor, a pump, or other mechanical device, either directly or indirectly. Additionally, as will be recognized by those skilled in the art after a complete reading of the present application, a plurality of turbines may be employed with the system depicted in FIG. 3.

Figure 4:
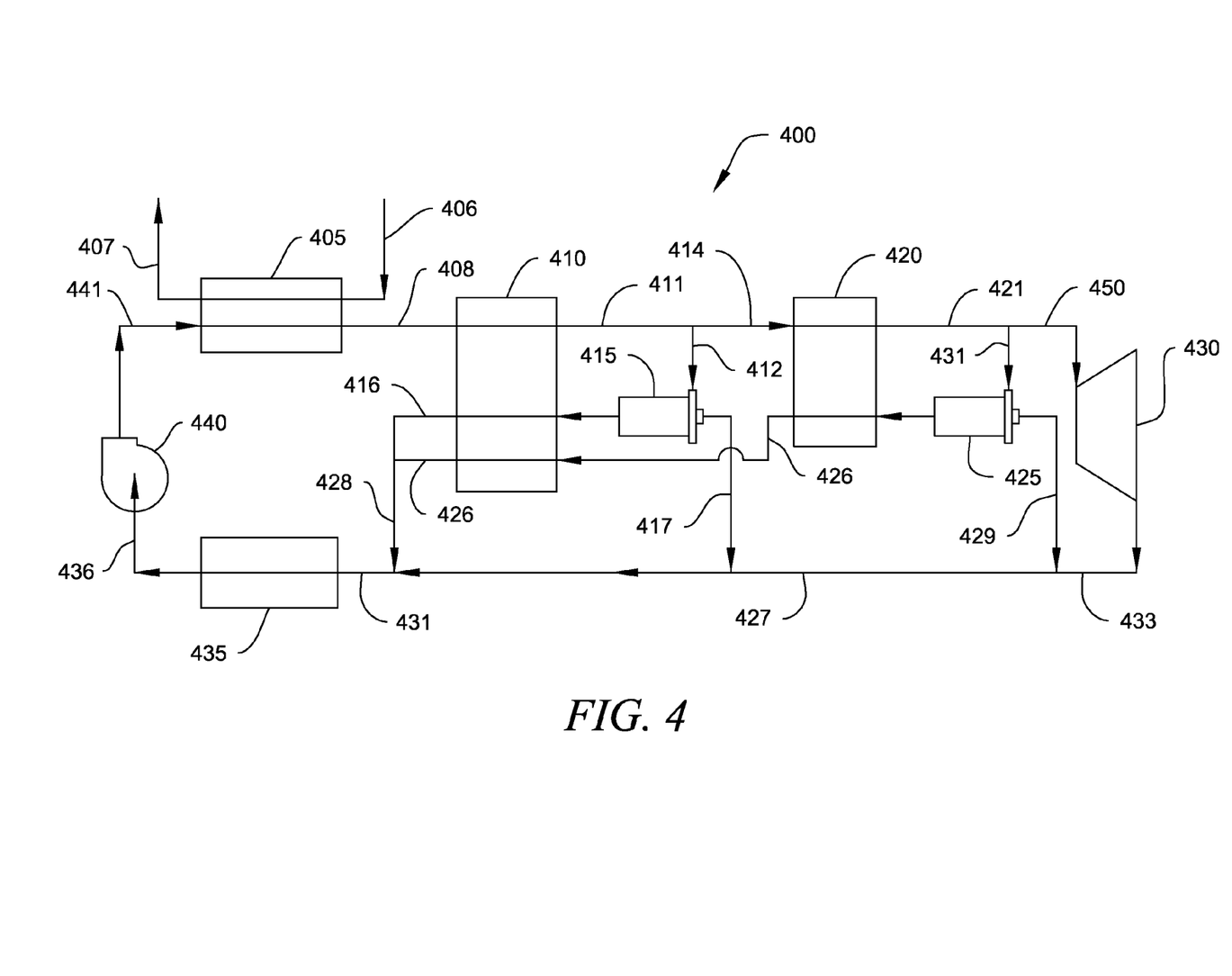
FIG. 4 is a schematic diagram of one illustrative embodiment of the present invention employing multiple vortex tubes and pre-heat exchangers arranged prior to a turbine, and first heat exchanger are configured to amplify the recovered heat.

The present invention is shown in FIG. 4, which is comprised of a first heat-exchanger HE 405 that receives a heated source fluid supply 406 and releases a cooler exhaust fluid 407. The first heat-exchanger HE 405 heats a fluid source 441 to provide a heated supply fluid stream, $T_o$ 408 to a second heat exchanger 410, which emits a fluid stream 411. The fluid stream 411 is split into fluid streams 412 and 414, with fluid stream 412 being provided to a first counterflow vortex tube VT 415. The first high flow-rate low-grade temperature vortex tube VT 415 segregates the fluid stream 412 into a hot fluid stream, $T_H$ 416, and cool fluid stream, $T_C$ 417, fraction streams. At the first vortex tube VT 415, a fraction of intensely hot vapor, $T_H$ 416, created by the corollas force compression through the throttle valve in the first vortex tube VT 415, where fluid stream 416 is fed into fluid stream 428.

The fluid stream 416 is provided to a second heat exchanger HE 410, which transfers heat to the hot fluid stream 408 to increase the temperature of the fluid flows 411 at the heat exchanger HE 410. The heat exchanger 410 emits a hot input fluid 411 to a fluid flow 414 to a third heat exchanger 420, which emits a fluid stream 421. The fluid stream 421 is split into fluid streams 431 and 450, with fluid stream 431 being provided to a second counterflow vortex tube VT 425. The second high flow-rate low-grade temperature vortex tube VT 425 segregates the fluid stream 431 into a hot fluid stream, $T_H$ 426, and cool fluid stream, $T_C$ 429, fraction streams. At the second vortex tube VT 425, a fraction of intensely hot vapor, $T_H$ 426, created by the corollas force compression through the throttle valve in the second vortex tube VT 425, where fluid stream 426 is fed into fluid stream 428.

The fluid stream 426 is provided to a third heat exchanger HE 420, which transfers heat from the hot fluid stream 426 to increase the temperature of the fluid flows 414 at the heat exchanger HE 420. The heat exchanger 420 emits a hot input fluid 421 to a fluid flow 450 to the power producing turbine 430 via fluid flow 450, yielding a greater power extraction than previously attained with other systems. The stream fluid flow 450 is fed into turbine 430 to produce electricity or convert the heat energy into a work, electrical or motive force.

The function of the first and second counter-flow vortex tubes in the present invention is to receive the evaporated heat-exchanger flow supply of supercritical vapor, 412 and 431, through tangential nozzle(s) and to discharge a fraction of cool expanded vapor, $T_C$ 417 and 429, through a small hole in the diaphragm, and a fraction of intensely hot vapor fluid stream, $T_H$ 416 and 426, created by the corollas force compression through the throttle valve. It is important to note that vapor does not respond as an ideal gas; therefore, actual data should be used to predict performance of the vortex tube.

By separating the hot and cool fractions causing a reduction in the pressure, the cool fraction, $T_C$ 417 and 429, is combined and routed to a condenser 435 through fluid stream 431. The temperature and pressure of stream fluid flow 450 is lowered when it emerges from power turbine 430 in feed stream 433, which is combined with fluid streams 429, 427, 417 and 428 to produce fluid stream 431.

The condensed fluid stream 431 is transmitted to the condenser 435, and condensed to a lower temperature and pressure, which is fed into pump 440 via fluid stream 436. Pump 440 transmits the fluid stream 441 back to the heat exchanger HE 405 to complete the cycle, and reheat the fluid stream into supply fluid stream $T_o$ 408 for transmission back to the first and second vortex tubes VT 415 and 425, as well as the power turbine 430 after the temperature of that feed stream 450 was stepped up twice by heat exchanger 410 and 420.

A choice of $CO_2$ as an elevated temperature, compressible fluid can achieve good thermal contact (wet) at commercial rates of heat production from the Texas lower-grade geothermal reservoirs (EGSs) for sustained periods of time. The main cycle typically employs a lower-pressure refrigerant with reasonable vapor pressures at its normal operating condition. ASHRAE refrigerant designations: HFC-134a, R-125, R-410A, and R-407C (23/25/52) have been developed for this type application.

Figure 5:
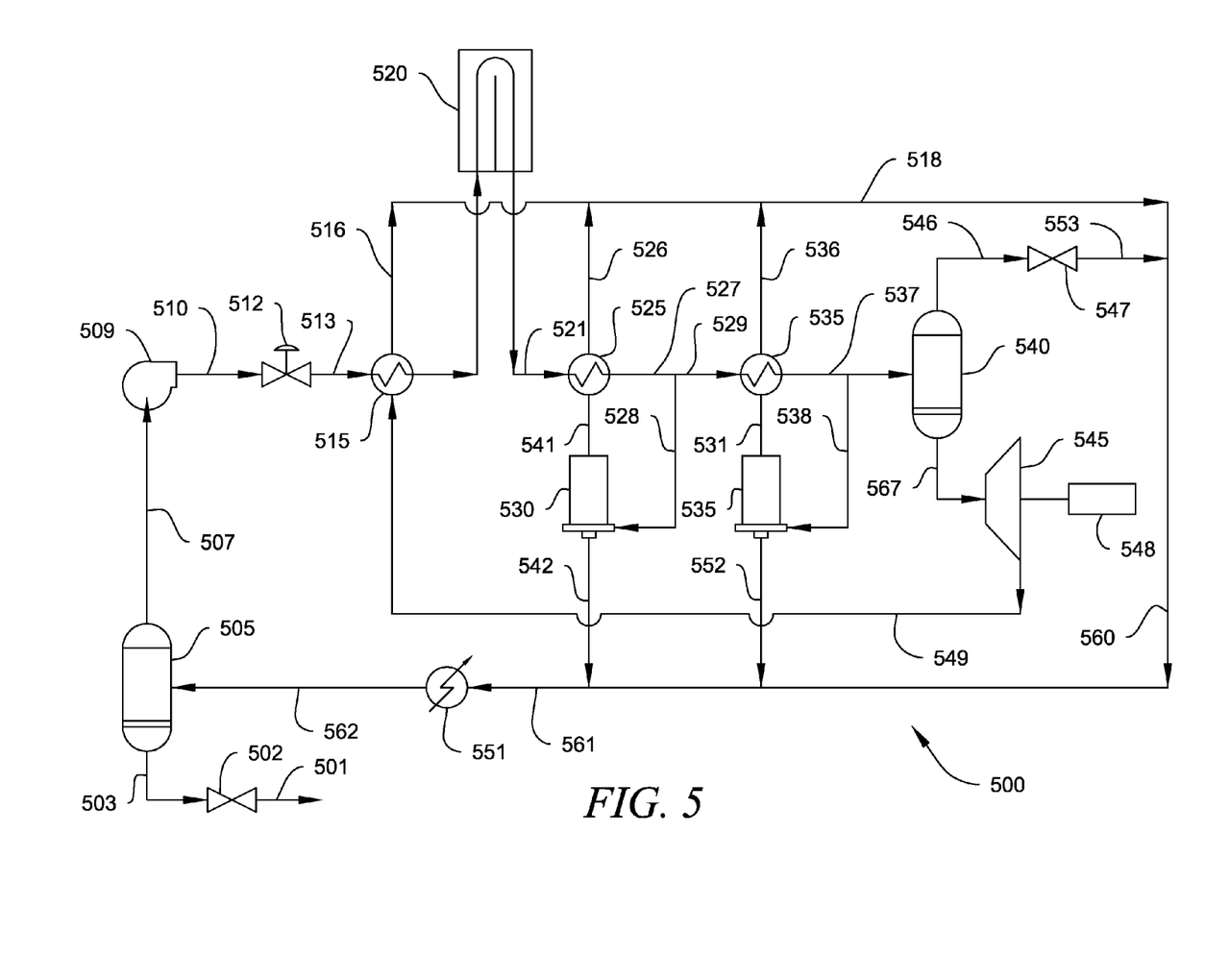
FIG. 5 is a schematic diagram of one illustrative embodiment of the present invention employing multiple vortex tubes and pre-heat exchangers arranged prior to a turbine to amplify the recovered heat, wherein an economizer heat exchanger and first heat exchanger are configured.

The present invention is also shown in FIG. 5, which is comprised of a input/output line 501 coupled to a make-up add/take outflow valve 502. Valve 502 is coupled to a steam drum 505 via fluid line 503, with the steam drum separating the liquid from gas in the fluid line. The steam drum 505 is coupled to a pump 509 via connection 507, and the pump connected to a control valve 512 via connection 510, and the control valve 512 being coupled to first heat exchanger 515 via connection 513.

First heat exchanger 515 increases the temperature of the fluid flow from inlet line 513 to an increased temperature fluid flow 521 on the outlet of heat exchanger 515. The heat exchanger 515 receives a fluid flow inlet stream 549 and ejects an outlet fluid flow stream at stream 516. The outlet line 521 feeds fluid flow into the primary heat source 520, which increases the temperature of the fluid flow through line 521. Stream fluid line 521 is coupled to a second heat exchanger 525, where the fluid temperature is increased. The second heat exchanger 525 is coupled to a third heat exchanger 535 through lines 527 and 529, and the third heat exchanger 535 is coupled to a steam drum 540 though fluid lines 537.

Fluid on line 527 is split onto fluid lines 528 and 529, with fluid line 528 being provided to a first counterflow vortex tube VT 530. The first high flow-rate low-grade temperature vortex tube VT 530 segregates the fluid stream 528 into a hot fluid stream, $T_H$ 541, and cool fluid stream, $T_C$ 542, fraction streams. At the first vortex tube VT 530, a fraction of intensely hot vapor, $T_H$ 541, created by the corollas force compression through the throttle valve in the first vortex tube VT 530, where fluid stream 541 is transferred through the second heat exchanger 525. The fluid line 541 adds heat to the heat exchanger 525, and the fluid is ejected at fluid line 526. The heat exchanger 525 receives a fluid flow inlet stream 541 and ejects an outlet fluid flow stream at stream 526.

Fluid on line 537 is split partially onto fluid line 538, with fluid line 538 being provided to a second counterflow vortex tube VT 535. The second high flow-rate low-grade temperature vortex tube VT 535 segregates the fluid stream 538 into a hot fluid stream, $T_H$ 531, and cool fluid stream, $T_C$ 552, fraction streams. At the first vortex tube VT 535, a fraction of intensely hot vapor, $T_H$ 531, created by the corollas force compression through the throttle valve in the first vortex tube VT 535, where fluid stream 531 is transferred through the third heat exchanger 535. The fluid line 531 adds heat to the heat exchanger 535, and the fluid is ejected at fluid line 536. The heat exchanger 535 receives a fluid flow inlet stream 531 and ejects an outlet fluid flow stream at stream 536.

Fluid flow streams 516, 526, and 536 are ejected from the first, second and third heat exchangers 515, 525 and 535 and combined at fluid stream 518. The steam drum 540 separates the liquid and vapor portions of the fluid flow on fluid line 537 through an evaporation procedure (taking out liquid from stream vapor), with the liquid portion being provided over fluid line 546 to the control valve 547. The control valve 547 provides a fluid flow of liquid to fluid stream 518, which combines to produce the fluid stream 560. The vapor portion of the fluid flow from fluid line 537 is separated by the steam drum 540 and the stream vapor is fed to the power turbine 545 via connection 567 so the power turbine 545 can drive the coupled generator 548. After use by the power turbine 545, the fluid flow from the power turbine 545 is provided along line 549 to the first heat exchanger 515 to use any residual heat as a heat intensifier for the fluid stream 513 being acted upon by the first heat exchanger 515.

The combined fluid flow stream 560 is combined with the cool fluid stream, T 552 fraction stream from the second vortex tube 535 and the cool fluid stream, $T_C$ 542 fraction stream from the first vortex tube 530. The fluid flow stream 561 results from the combination of fluid flow streams 560, 552 and 542. Fluid flow stream 561 is input into condenser 551, with the condensed fluid flow being input into steam drum 505 through fluid flow stream connection 562.

Referring now more particularly to the accompanying drawing and particular to the schematic design and flow diagram of FIG. 5, which illustrates one embodiment of the invention, a closed thermal intensifier loop comprised of a heat-exchanger for transferring thermal energy directly from a low grade heat source to the Organic Rankine Cycle (ORC) system; two or three conventional counter-flow vortex tubes (VT) arranged to intensify the thermal output from the low grade heat source before entering the power producing turbine; two pre-heat-exchangers to increase the temperature (from 191.7° F. to 215° F.) of the high pressure refrigerant before segregating into two fractions, namely extremely hot, 252° F., and cool, 108° F.

The vortex tubes 530 and 535 are supplied with pre-heated refrigerant passing through the up-stream pre-heat-exchangers—the heart of this invention. The low pressure hot, 252° F., fraction flow from the vortex tube body is routed to the pre-heat-exchanger to transfer its heat to the high pressure high temperature refrigerant, 203° F. After the low pressure hot, 252° F., fraction flow has transferred heat, 215° F., it continues up-stream to the previous pre-heat-exchanger to increase the hot fluid flow rate (ṁ=1) and transfer residual heat. After the low pressure hot fraction flow, 248° F. and 215° F., have transferred their residual heat, 203° F., it is mixed with the re-heated cold, 191.7° F., fraction.

The average enthalpy of the mixture is 124.315 BTU/lbm resulting in a temperature of 196.9° F. The cold, 106° F., fraction is no longer involved with the intensification operation and is re-heated in the heat-exchanger in preparation for being mixed with the 203° F. low pressure fraction outflow. By developing a higher heat transfer temperature, from 191.7° F. to 196.9° F., the ORC cycle is enabled to produce power more efficiently than if the low-grade temperature, 145.3° F., was directly used.

The vortex tubes 530 and 535 are disposed with a diaphragm closing one end of the tube body and a small hole in the center of the diaphragm, at least one tangential nozzle piercing the tube body just inside the diaphragm, and an obstruction and throttle valve at the far end of the tube body; for amplifying the heat and temperature higher than the heat source temperature, and transferring just the amplified heat via the heat-exchanger to the ORC. The disposed vortex tube receives the supercritical produced well fluid vapor, 215° F., through tangential nozzles and to discharge a stream of cool expanded vapor, 108° F., through a small hole in the diaphragm, and a stream of intensely hot vapor, 252° F., created by the corollas force compression through the throttle valve. It is important to note that vapor does not respond as an ideal gas; therefore, actual data should be used to predict performance of the vortex tube.

The counter-flow vortex tube, capable of high-pressure and large mass flow rate, receives the compressible supercritical vapor and a low-grade temperature, 203° F., thermal output indirectly from the heat source that is segregated into two fractions, namely hot, 252° F., and cold, 108° F. The hot, 252° F., fraction inflow from the vortex tube body is routed to the well fluid inlet of the heat-exchanger. The temperature, 252° F., of the hot fraction are significantly higher than the low-grade temperature, 203° F. Separating the produced well fluid vapor into hot, 252° F., and cold, 108° F., streams causes a reduction in the well fluid pressure similar to that of a Joule-Thomson valve (JT expansion valve). The cold, 108° F., fraction is not involved farther with the intensification operation and bypasses the heat-exchanger to be mixed with the now warm, 252° F., fraction outflow.

Figure 6:
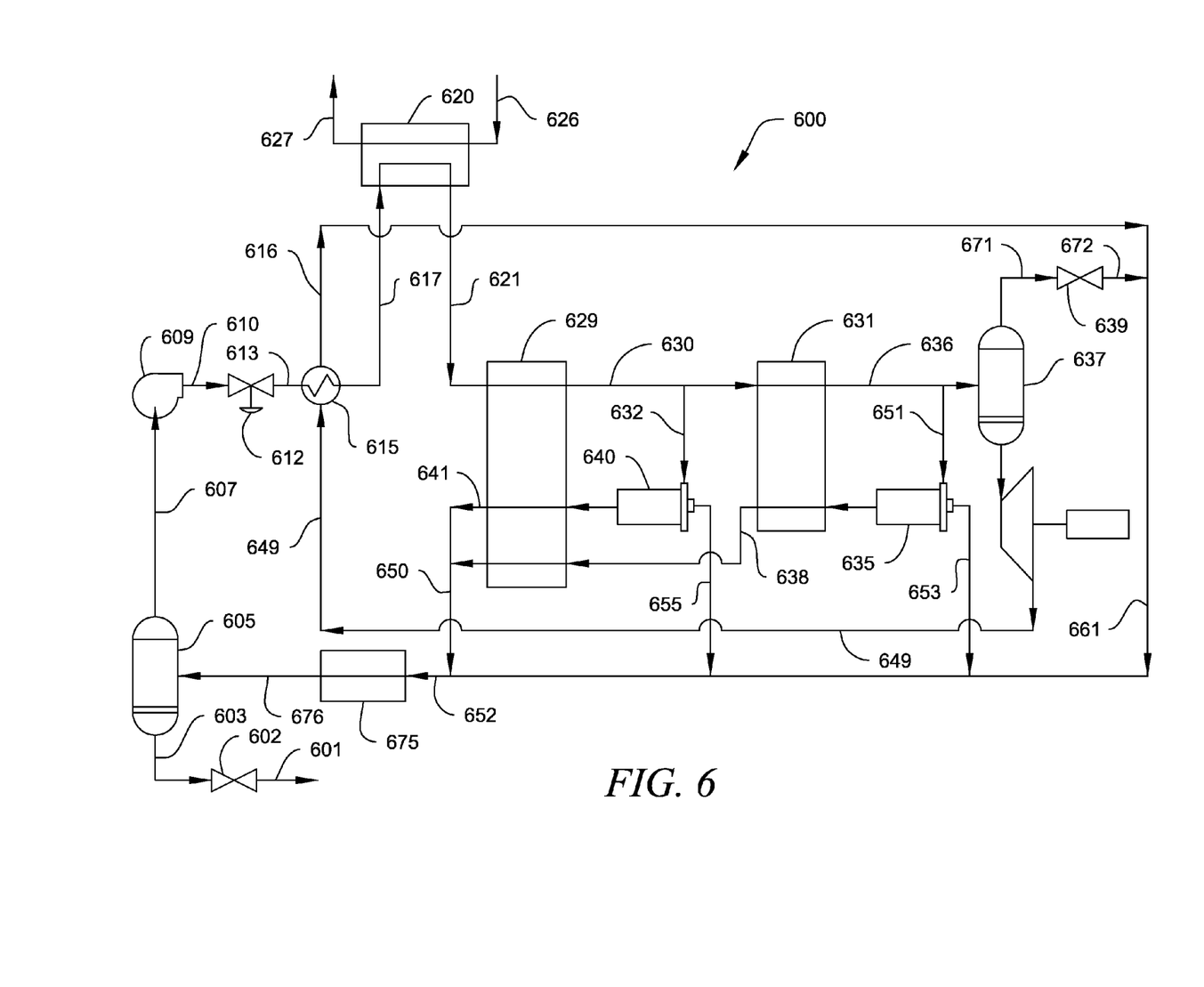
FIG. 6 is a schematic diagram of one illustrative embodiment of the present invention employing multiple vortex tubes and pre-heat exchangers arranged prior to a turbine to amplify the recovered heat, wherein an economizer heat exchanger and first heat exchanger are configured.

The present invention is also shown in FIG. 6, which is comprised of a input/output line 601 coupled to a make-up add/take outflow valve 602. Valve 602 is coupled to a steam drum 605 via fluid line 603, with the steam drum separating the liquid from gas in the fluid line. The steam drum 605 is coupled to a pump 609 via connection 607, and the pump connected to a control valve 612 via connection 610, and the control valve 612 being coupled to first heat exchanger 615 via connection 613.

First heat exchanger 615 increases the temperature of the fluid flow from inlet line 613 to an increased temperature fluid flow 617 on the outlet of heat exchanger 615. The heat exchanger 615 receives a fluid flow inlet stream 649 to give up heat in heat exchange 615 and ejects an outlet fluid flow stream at stream 617. The outlet line 617 feeds fluid flow into the primary heat source 620, which increases the temperature of the fluid flow on fluid stream line 621. Line 621 is coupled to a second heat exchanger 629, where the fluid temperature is increased. The second heat exchanger 629 is coupled to a third heat exchanger 631 through fluid line 630, the third heat exchanger 631 is coupled to a steam drum 637 though fluid lines 636.

Fluid on line 630 is split onto fluid line 632, with fluid line 632 being provided to a first counterflow vortex tube VT 640. The first high flow-rate low-grade temperature vortex tube VT 640 segregates the fluid stream 632 into a hot fluid stream, $T_H$ 641, and cool fluid stream, $T_C$ 655, fraction streams. At the first vortex tube VT 640, a fraction of intensely hot vapor, $T_H$ 641, created by the corollas force compression through the throttle valve in the first vortex tube VT 640, where fluid stream 641 is transferred through the second heat exchanger 629 to step up the temperature of the fluid stream 621. The fluid line 641 adds heat to the heat exchanger 629, and the fluid is combined with the fluid flow 638 to produce a fluid stream 650.

Fluid on line 636 is split onto fluid line 651, with fluid line 651 being provided to a second counterflow vortex tube VT 635. The second high flow-rate low-grade temperature vortex tube VT 635 segregates the fluid stream 651 into a hot fluid stream, $T_H$ 638, and cool fluid stream, $T_C$ 653, fraction streams. At the second vortex tube VT 635, a fraction of intensely hot vapor, $T_H$ 638, created by the corollas force compression through the throttle valve in the first vortex tube VT 635, where fluid stream 638 is transferred through the third heat exchanger 631 to step up the temperature of fluid stream 630 and then to second heat exchanger 629 to step up the temperature of the fluid stream 621. After being ejected from the second heat exchanger 629, the fluid line 638 is combined with the fluid flow 641 to produce a fluid stream 650.

The steam drum 637 receives the heated fluid stream 636 and separates the liquid and vapor portions of the fluid flow on fluid line 636 through an evaporation procedure (taking out liquid from steam vapor), with the liquid portion being provided over fluid line 671 to the control valve 639. The control valve 639 provides a fluid flow of liquid to fluid stream 616 through connection 672, which combines to produce the fluid stream 661.

The vapor portion of the fluid flow from fluid line 636 is separated by the steam drum 637 and the steam vapor is fed to the power turbine 645 through connection 667 that drives the coupled generator 648. After use by the power generator 645, the fluid flow from the power generator 645 is provided along line 649 to the first heat exchanger 615 to use any residual heat as a heat intensifier for the fluid stream 613 being acted upon by the first heat exchanger 615.

The combined fluid flow stream 661 is combined with the cool fluid stream, $T_C$ 653 fraction stream from the second vortex tube 635 and the cool fluid stream, $T_r$ 655 fraction stream from the first vortex tube 640. The fluid flow stream 652 results from the combination of fluid flow streams 653, 655 and 650. Fluid flow stream 652 is input into condenser 675, with the condensed fluid flow being input into steam drum 605 through fluid flow stream connection 676.

A preferred application of this particular invention is shown in FIG. 6. The accompanying drawing and schematic depicts a binary topper cycle and flow diagram attached to a main improved ORC cycle. The topper and main cycles each are closed cycles connected by a common heat exchanger. The topper cycle, as shown, converts a low grade heat, 145.3° F., into sufficient heat, 226.0° F., to vaporize the refrigerant, R410A, of the main cycle. One sixth (⅙) of the total pump flow, ṁ=3, is used to transfer heat in this configuration. If the third VT was eliminated, the subject intensifier could provide sufficient heat, 172.5° F., to vaporize the refrigerant. In this instance, one third (⅓) of the total pump flow, ṁ=3, could be used to transfer heat, doubling the heat bearing fluid flow (ṁ=½ to ṁ=1) for the same pump flow, ṁ=3.

The subject thermal intensifier invention exhibits three pressure regions, namely 1) the high temperature high pressure region, 1,400 psia, 2) the hot temperature low pressure region, 682 psia, and 3) the cold temperature low pressure region, 682 psia, separated by a pump and two or three conventional counter-flow vortex tubes arranged to intensify the "hot" VT output. The hot and cold pressure regions can also be design to be the same for potential mixing as shown in this embodiment, but they can be different, enabling a higher temperature separation. In the event they are different, a Joule-Thomson valve (JT expansion valve) or Vortex Tube can be used to reduce the pressure for mixing. Both pressure designs are within the scope of the invention even though the design showing different pressures is not shown.

The Thermal Intensifier comprised of: a heat-exchanger for transferring thermal energy directly from a low grade heat source to the closed topping cycle (same as the Thermal Intensifier); two or three conventional counter-flow vortex tubes arranged to intensify the thermal output from the low grade heat source before thermal transfer to the main ORC cycle; two pre-heat-exchangers to increase the temperature (from 145.3° F. to 172.5° F.) of the high pressure refrigerant before segregating into two fractions, namely extremely hot, 226° F., and cool, 82° F., the external energy transfer heat-exchanger used to evaporate the main cycle refrigerant, 226° F., the latent heat removing heat-exchanger (condenser), and the recycling liquid pump.

The vortex tubes 530 and 535 are supplied with pre-heated refrigerant passing through the up-stream pre-heat-exchangers—the heart of this invention. The low pressure hot, 226° F., fraction flow from the vortex tube body is routed to the pre-heat-exchanger to transfer its heat to the high pressure high temperature refrigerant, 160.4° F. After the low pressure hot, 226° F., fraction flow has transferred heat, 172.5° F., it continues up-stream to the previous pre-heat-exchanger to increase the hot fluid flow rate (ṁ=1) and transfer residual heat. After the low pressure hot fraction flow, 220° F. and 172.5° F., has transferred its residual heat, 160.4° F., it is mixed with the cold, 85.6° F., fraction.

The average enthalpy of the mixture is 68 BTU/lbm resulting in a temperature of 137° F. The cold, 85.6° F., fraction is no longer involved with the intensification operation and bypasses the heat-exchangers to be mixed with the 160.4° F. low pressure fraction outflow. By developing a higher heat transfer temperature, from 145.3° F. to 226° F., the main cycle is enabled to produce power more efficiently than if the low-grade temperature, 145.3° F., was directly used. The temperature, 226° F., and heat, 147.51 BTU/lbm, (enthalpy) of the extremely hot fraction are significantly higher than the low-grade source temperature, 145.3° F., and heat, 68.054 BTU/lbm.

FIG. 6 illustrates the essentials of a closed binary vapor cycle, without valves, start-up and bypass piping, refrigerant supply and make-up systems. The essential control system for the binary vapor cycle is not shown. The Thermal Intensifier can be manufactured as a separate independent skid unit from the main ORC cycle skid unit. The two skid units can be connected by hose connections.

Figure 7:
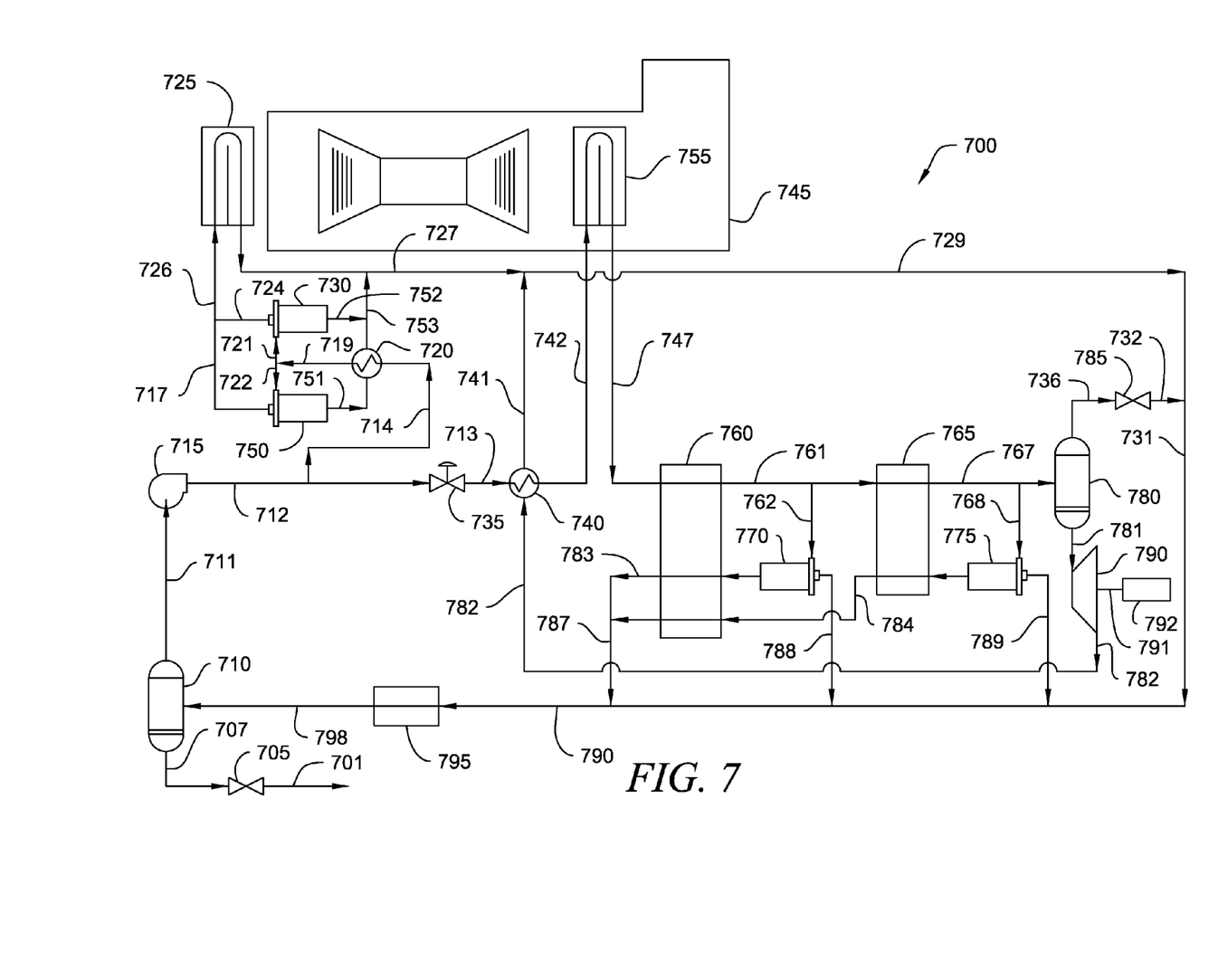
FIG. 7 is a schematic depiction of one illustrative embodiment of the present invention wherein a refrigeration system is employed to chill the inlet air of a gas turbine.

The present invention is also shown in FIG. 7, which is comprised of a input/output line 701 coupled to a make-up add/take outflow valve 705. Valve 705 is coupled to a steam drum 710 via fluid line 707, with the steam drum separating the liquid from gas in the fluid line. The steam drum 710 is coupled to a pump 715 via connection 711, and the pump 715 is connected to a control valve 735 via connection 712, and the control valve 735 being coupled to first heat exchanger 740 via connection 713.

A portion of the fluid stream 712 from the pump 715 is split off to be input into a second heat exchanger 720 that preheats the fluid stream 714 into a vapor stage that is ejected at fluid stream 719. The vapor fluid stream 719 is input into a first and second vortex tube 730 and 750 at inputs 721 and 722, respectively. The vortex tubes 730 and 750 emit cool phase streams 724 and 717 as a combined input stream 726 into a first heat source 725, which emits a heated fluid stream 727. The hot flow stream 751 is input into the first heat exchanger 720 to evaporate fluid and emit heat to input stream 714. The heat exchanger 720 emits an output stream 753 which is combined with the hot flow stream 752 to be provided to stream 727. The heated fluid stream 727 is combined with the hot phase streams 752 and 751 being produced by the first and second vortex tubes 730 and 750, which are combined to produce stream 753. The heated fluid stream 727 is also combined with the fluid stream 741 being ejected from the first heat exchanger 740 after providing heat to the input fluid stream 713 and producing an increased temperature fluid stream 742.

First heat exchanger 740 increases the temperature of the fluid flow from inlet line 713 to an increased temperature fluid flow 742 on the outlet of heat exchanger 740. The outlet stream line 742 feeds fluid flow into a second primary heat source 755, which increases the temperature of the fluid flow on fluid stream line 747. Line 747 is coupled to a third heat exchanger 760, where the fluid temperature is increased. The third heat exchanger 760 is coupled to a fourth heat exchanger 765 through fluid line 761, the fourth heat exchanger 765 is coupled to a steam drum 780 though fluid line 767.

Fluid on line 761 is split onto fluid line 762, with fluid line 762 being provided to a third counterflow vortex tube VT 770. The third high flow-rate low-grade temperature vortex tube VT 770 segregates the fluid stream 762 into a hot fluid stream, $T_H$ 783, and cool fluid stream, $T_C$ 788, fraction streams. At the third vortex tube VT 770, a fraction of intensely hot vapor, $T_H$ 783, created by the corollas force compression through the throttle valve in the third vortex tube VT 770, where fluid stream 783 is transferred through the third heat exchanger 760 to step up the temperature of the fluid stream 747. The fluid line 783 adds heat to the heat exchanger 760, and the fluid is combined with the fluid flow 784 to produce a fluid stream 787.

Fluid on line 767 is split onto fluid line 768, with fluid line 768 being provided to a fourth counterflow vortex tube VT 775. The fourth high flow-rate low-grade temperature vortex tube VT 775 segregates the fluid stream 768 into a hot fluid stream, $T_H$ 784, and cool fluid stream, $T_C$ 789, fraction streams. At the fourth vortex tube VT 775, a fraction of intensely hot vapor, $T_H$ 784, created by the corollas force compression through the throttle valve in the fourth vortex tube VT 775, where fluid stream 784 is transferred through the fourth heat exchanger 765 to step up the temperature of fluid stream 761 and then to third heat exchanger 760 to step up the temperature of the fluid stream 747. After being ejected from the third heat exchanger 760, the fluid line 784 is combined with the fluid flow 783 to produce a fluid stream 787.

The steam drum 780 receives the heated fluid stream 767 and separates the liquid and vapor portions of the fluid flow on fluid line 767 through an evaporation procedure (taking out liquid from steam vapor), with the liquid portion being provided over fluid line 736 to the control valve 785. The control valve 785 provides a fluid flow of liquid to fluid stream 729 through connection 732, which combines to produce the fluid stream 790.

The vapor portion of the fluid flow from fluid line 767 is separated by the steam drum 780 and the steam vapor is fed to the power turbine 790 through connection 781 so the power turbine 790 can drive the coupled generator 792. After use by the power generator 790, the fluid flow from the power generator 790 is provided along line 782 to the first heat exchanger 740 to use any residual heat as a heat intensifier for the fluid stream 713 being acted upon by the first heat exchanger 740.

The combined fluid flow stream 729 is combined with the cool fluid stream, $T_C$ 789 fraction stream from the fourth vortex tube 775 and the cool fluid stream, $T_C$ 788 fraction stream from the third vortex tube 640, as well as the combined fluid streams 783 and 784 that were combined to produce a combined fluid stream 787. The fluid flow stream 790 results from the combination of fluid flow streams 729, 732, 789, 788 and 787. Fluid flow stream 790 is input into condenser 795, with the condensed fluid flow being input into steam drum 710 through fluid flow stream connection 798.

In one specific embodiment, FIG. 7, of the present invention, the mechanical power available at the output shaft of the turbine may be utilized directly or through a gearbox to provide mechanical work to drive an electrical power generator to produce electrical power either as a constant voltage and constant frequency AC source or as a DC source which might be rectified to produce AC power at a constant voltage and constant frequency.

In the above embodiments, the mechanical power available at the output shaft of the turbine may be utilized directly or through a gearbox to provide mechanical work to drive any combination of mechanical devices such as a compressor, a pump, a wheel, a propeller, a conveyer, a fan, a gear, or any other mechanical device(s) requiring or accepting mechanical power input. Moreover, the present invention is not restricted to stationary devices, as it may be utilized in or on an automobile, a ship, an aircraft, a spacecraft, a train, or other non-stationary vessel.

A specific byproduct of this method is an effective and dramatic reduction in the emissions of both pollutants and greenhouse gases. This method may not require any fuel nor does it generate any pollutants or greenhouse gases or any other gases as byproducts. Any process to which this method may be applied, such as a gas turbine or a diesel engine, will generate significantly more power with no increase in fuel consumption or pollution. The effect of this method is a net reduction in the specific pollution generation rate on a mass per power produced basis.

In one illustrative embodiment, the present invention is directed to a system comprised of a first heat exchanger adapted to receive a fluid (liquid or vapor) from a source of waste heat wherein a working fluid is passed through the first heat exchanger and is converted to vapor via heat transfer from the fluid from waste heat source. The high-pressure, superheated compressible vapor is then expanded through at least one vortex tube segregating the compressible working vapor into hot and cold fractions. The vapor fractions exiting the vortex tube are at a lower pressure. The superheated vapor fraction is then introduced into the pre-heat exchanger to preheat the high pressure working vapor feeding both the vortex tube and the power producing turbine. The vortex tube significantly enhances the efficiency of the system.

The low pressure, high temperature discharge from the vortex tube is routed to a pre-heat exchanger that is positioned upstream of the vortex tube and turbine. The pre-heat exchanger may be used to recover heat developed by the vortex tube and use it to preheat the high pressure working vapor prior to the high pressure working vapor being introduced into the vortex tube and turbine. The steps to increase the temperature of the high pressure first temperature working vapor in the pre-heat exchanger from a first temperature to a second temperature, higher than the temperature of the heat source fluid, by transferring heat from the low pressure high energy working vapor fraction prior to the introduction of the high-pressure working vapor at the second temperature into both the vortex tube and the power producing turbine; thereby, extending the high pressure working vapor temperature range by amplifying the recovered heat and temperature energy transferred from the thermogenic fluid.

By separating the energies, causing a reduction in pressure, the lesser energy fraction is passed back through the first heat exchanger for reheating, then combining the reheated vapor with the intensely high energy vapor fraction increasing the total working vapor temperature to a second temperature, higher than the temperature of the heat source fluid, i.e., amplifying the energy by increasing the first temperature to a second temperature prior to routing to a power producing turbine.

Amplification may be further increased with the addition of vortex tubes and associated piping. At least one power producing turbine adapted to receive the second temperature at a lesser pressure working vapor. The system further comprises a condenser heat exchanger that is adapted to receive the turbine exhaust vapor, wherein the temperature of the exhaust vapor is reduced via heat transfer, rejecting the waste heat to the surrounding atmosphere at atmospheric temperatures; wherein, the working vapor is converted to a saturated liquid and returned to the first heat exchanger by a pumping means for further cycling.

The low pressure low temperature discharge from the vortex tube may be used to cool the low pressure high temperature discharge from the turbine, typically still slightly superheated, and, thus, reduce the required size and cost of the condenser. The cooled vapor exiting the turbine is condensed at low pressure using the condenser heat exchanger.

A drum adapted to receive the vapor exiting the first heat exchanger, a turbine adapted to receive the vapor exiting the drum, and an economizer heat exchanger adapted to receive exhaust vapor from the turbine to heat working fluid provided to the heat recovery heat exchanger via heat transfer with the exhaust vapor from the turbine. In one particular illustrative embodiment, a refrigerant R-123 may be employed as the working fluid. In various embodiments of the present invention, the vapor that exits the first heat exchanger must be first compressible and super-critical second. Additionally, the fluid used to heat the working fluid in the heat recovery heat exchanger may be provided from a variety of sources, e.g., waste heat from any industrial process, a solar energy source, a cement plant, a manufacturing process, a reciprocating engine, a gas turbine, etc.

The systems shown in FIGS. 1-7 with the addition of an economizer heat exchanger to pre-heat the high pressure working fluid with the heat of the low pressure turbine exhaust from at least one power producing turbine, wherein, the temperature of the high-pressure working fluid is increased prior to the introduction of the pre-heated high pressure working fluid into the first heat exchanger. The temperature of the pre-heated high pressure working fluid will never be higher than the exhaust temperature of the turbine.

Such a system provides increased efficiency relative to prior art systems. This is due at least in part to the use of the economizer heat exchanger's use of the exhaust fluid from the turbine to preheat the working fluid prior to its introduction into the heat recovery heat exchanger. Additionally, the present invention may be useful in reducing the amount of waste heat that is absorbed by the environment, as a portion of the exhaust fluid from the turbine is used in preheating the working fluid prior to its introduction into the heat recovery heat exchanger. Due to this reduction in the amount of waste heat, the size of other equipment, such as the condenser depicted in FIG. 7, may be reduced. Thus, the present invention may be useful in reducing the amount of heat exhausted to the environment, reducing the size of some of the equipment employed in such systems and/or increase the overall operating efficiency of such a system.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A process for generating a motive work force, comprising the steps of:
    heating a first fluid stream in a first heat exchanger, said first heat exchanger producing a second fluid stream that has a higher temperature than the first fluid stream, said first heat exchanger receiving heat from a first external heat source generated from a low-grade heat source,
    providing said second fluid stream to a second heat exchanger where the temperature of the second fluid stream is increased,
    providing a first portion of the second fluid stream to a first vortex tube where that first portion of the second fluid stream is segregated into a hot second fluid stream and a cool second fluid stream,
    providing said hot second fluid stream to the second heat exchanger, said second heat exchanger receiving heat energy from the hot second fluid stream to increase the temperature of the second fluid stream,
    providing said second portion of the second fluid stream to a third heat exchanger where the temperature of the second portion of the second fluid stream is increased,
    providing the second portion of the second fluid stream to a second vortex tube where that first portion of the second fluid stream is segregated into a hot third fluid stream and a cool third fluid stream,
    providing said hot third fluid stream to the third heat exchanger, said third heat exchanger receiving heat energy from the hot third fluid stream to increase the temperature of the second fluid stream,
    providing the hot second and hot third fluid streams to a power turbine to generate a motive force in that turbine, said power turbine producing a fourth fluid stream that has a lower temperature and pressure than the hot second portion or hot third fluid stream,
    providing the fourth fluid stream to the first heat exchanger for re-heating of said first fluid stream.

2. The process of claim 1 wherein the second fluid stream is a supercritical vapor.

3. The process of claim 1 wherein the heat source is a geothermal energy heat source.

4. The process of claim 1 wherein the cool second stream and cool third streams are combined and reheated in first heat exchanger.

5. The process of claim 4 wherein the cool second stream and cool third streams are provided to a power turbine after the streams are combined and reheated in first heat exchanger.

6. The process of claim 1 wherein the hot third fluid stream is provided to the second heat exchanger, said second heat exchanger receiving heat energy from the hot second fluid stream and the hot third fluid stream to increase the temperature of the second fluid stream.

7. The process of claim 1 wherein the first fluid stream pressure is increased by increasing the temperature of the hot second or hot third fluid stream.

8. The process of claim 1 further comprising the steps of:
    providing said fourth fluid stream to a condenser where the fluid temperature is decreased.

9. The process of claim 1 further comprising the steps of:
    pumping the fourth fluid stream to the first heat exchanger with a pump unit to provide the first fluid stream to the first heat exchanger.

10. The process of claim 1 wherein the motive work produced by the process is used in the production of electricity.

11. The process of claim 1 wherein the heat source includes a hydrocarbon combustion heat source.

12. A system for generating a motive force, comprising:
    a first heat exchanger that receives and heats a first fluid stream, said first heat exchanger produces a second fluid stream that has a higher temperature than the first fluid stream and said first heat exchanger receiving heat from a first external heat source generated from a low-grade heat source, a second heat exchanger receiving said second fluid stream and increasing the temperature of that second stream, a first vortex tube receiving a first portion of said second fluid stream from said second heat exchanger, said first portion of the second fluid stream is segregated into a hot second fluid stream and a cool second fluid stream by the first vortex tube, said hot second fluid stream is provided back to the second heat exchanger for transmitting heat energy from the hot second fluid stream to increase the temperature of the second fluid stream, a third heat exchanger receiving a second portion of the second fluid stream and increasing the temperature of the second portion of the second fluid stream, a second vortex tube receiving a second portion of said second fluid stream from said third heat exchanger, said second portion of the second fluid stream is segregated into a cool third fluid stream and a hot third fluid stream that is provided back to the third heat exchanger for transmitting heat energy from the hot third fluid stream to increase the temperature of the second portion of the second fluid stream, a power turbine receiving said hot second fluid stream and said hot third fluid stream to generate a motive force in that turbine, said power turbine producing a fourth fluid stream that has a lower temperature and pressure than the hot second fluid stream and the hot third fluid stream, aid fourth fluid stream being provided to the first heat exchanger for re-heating of said first fluid stream.

13. The system of claim 12 wherein the second fluid stream is a supercritical vapor.

14. The system of claim 12 wherein the heat source is a geothermal energy heat source.

15. The system of claim 12 wherein the cool second stream and cool third streams are combined and reheated in first heat exchanger.

16. The system of claim 15 wherein the cool second stream and cool third streams are provided to a turbine after the streams are combined and reheated in first heat exchanger.

17. The system of claim 12 wherein the hot third fluid stream is provided to the second heat exchanger, said second heat exchanger receiving heat energy from the hot second fluid stream and the hot third fluid stream to increase the temperature of the second fluid stream.

18. The system of claim 12 wherein the first fluid stream pressure is increased by increasing the temperature of the hot second or hot third fluid stream.

19. The system of claim 12 further comprising:
a condenser that receives said fourth fluid stream for decreasing the temperature of said fluid stream.

20. The system of claim 12 further comprising:
a pump that receives the fourth fluid stream from the condenser to pump that fourth fluid stream to the first heat exchanger.

21. The system of claim 12 wherein the motive work produced by the process is used in the production of electricity.

22. The system of claim 12 wherein the heat source includes a hydrocarbon combustion heat source.

23. A process for generating a motive work force, comprising the steps of:
heating a first fluid stream in a first heat exchanger, said first heat exchanger producing a second fluid stream that has a higher temperature than the first fluid stream, said first heat exchanger receiving heat from a first external heat source generated from a low-grade heat source, providing said second fluid stream to a second heat exchanger where the temperature of the second fluid stream is increased, providing a first portion of the second fluid stream to a first vortex tube where that portion of the second fluid stream is segregated into a hot second fluid stream and a cool second fluid stream, providing said hot second fluid stream to the second heat exchanger, said second heat exchanger receiving heat energy from the hot second fluid stream to increase the temperature of the second fluid stream, providing said second portion of the second fluid stream to a third heat exchanger where the temperature of the second portion of the second fluid stream is increased thereby producing a third fluid stream, providing a first portion of the third fluid stream to a second vortex tube where that first portion of the third fluid stream is segregated into a hot third fluid stream and a cool third fluid stream, providing said hot third fluid stream to the third heat exchanger, said third heat exchanger receives heat energy from the hot third fluid stream to increase the temperature of the second portion of the second fluid stream, providing a second portion of the third fluid stream from the third heat exchanger to a power turbine to generate a motive force in that turbine, said power turbine producing a fourth fluid stream that has a lower temperature and pressure than the second portion of the third fluid stream, providing the fourth fluid stream to the first heat exchanger for re-heating said first fluid stream.

24. The process of claim 23 wherein the second fluid stream is a supercritical vapor.

25. The process of claim 23 wherein the heat source is a geothermal energy heat source.

26. The process of claim 23 wherein the hot second stream and hot third streams are combined in second heat exchanger.

27. The process of claim 23 wherein the hot second and the hot third fluid stream is provided to the second heat exchanger, said second heat exchanger receiving heat energy from the hot second fluid stream and the hot third fluid stream to increase the temperature of the second fluid stream.

28. The process of claim 23 wherein the first fluid stream pressure is increased by increasing the temperature of the hot second or hot third fluid stream.

29. The process of claim 23 further comprising the steps of:
providing said fourth fluid stream to a condenser where the fluid temperature is decreased.

30. The process of claim 23 further comprising the steps of:
pumping the fourth fluid stream to the first heat exchanger with a pump unit to provide the first fluid stream to the first heat exchanger.

31. The process of claim 23 wherein the motive work produced by the process is used in the production of electricity.

32. The process of claim 23 wherein the heat source includes a hydrocarbon combustion heat source.

33. A system for generating a motive force, comprising:
a first heat exchanger that receives and heats a first fluid stream, said first heat exchanger produces a second fluid stream that has a higher temperature than the first fluid stream and said first heat exchanger receiving heat from a first external heat source generated from a low-grade heat source, a second heat exchanger receiving said second fluid stream and increasing the temperature of that second fluid stream, a first vortex tube receiving a first portion of said second fluid stream from said second heat exchanger, said first portion of the second fluid is segregated into a hot second fluid stream and a cool second fluid stream by the first vortex tube, said hot second fluid stream is provided back to the second heat exchanger for transmitting heat energy from the hot second fluid stream to increase the temperature of the second fluid stream, a third heat exchanger receiving a second portion of the second fluid stream and increasing the temperature of the second portion of the second fluid stream to produce a second portion of the second fluid stream, a second vortex tube receiving a first portion of said third fluid stream from said third heat exchanger, said first portion of the third fluid stream is segregated into a hot third fluid stream and a cool third fluid stream, said hot third fluid stream being provided back to the third heat exchanger for transmitting heat energy from the hot third fluid stream to increase the temperature of the third fluid stream, a power turbine receiving said second portion of the hot third fluid stream to generate a motive force in that turbine, said power turbine producing a fourth fluid stream that has a lower temperature and pressure than the hot second fluid stream and the hot third fluid stream, and said fourth fluid being provided to the first heat exchanger for re-heating of said first fluid stream.

34. The system of claim 33 wherein the second fluid stream is a supercritical vapor.

35. The system of claim 33 wherein the heat source is a geothermal energy heat source.

36. The system of claim 33 wherein the cool second stream and cool third streams are combined for reheating in first heat exchanger.

37. The system of claim 33 wherein the hot third fluid stream is provided to the second heat exchanger, said second heat exchanger receiving heat energy from the hot second fluid stream and the hot third fluid stream to increase the temperature of the second fluid stream.

38. The system of claim 33 wherein the first fluid stream pressure is increased by increasing the temperature of the hot second or hot third fluid stream.

39. The system of claim 33 further comprising:
a condenser that receives said fourth fluid stream for decreasing the temperature of said fluid stream.

40. The system of claim 33 further comprising:
a pump that receives the fourth fluid stream from the condenser to pump that fourth fluid stream to the first heat exchanger.

41. The system of claim 33 wherein the motive work produced by the process is used in the production of electricity.

42. The system of claim 33 wherein the heat source includes a hydrocarbon combustion heat source.

* * * * *